(12) United States Patent
Ikeda

(10) Patent No.: US 6,699,921 B2
(45) Date of Patent: Mar. 2, 2004

(54) RUBBER COMPOSITION FOR TIRE AND TIRE USING THE SAME

(75) Inventor: Keiji Ikeda, Kobe (JP)

(73) Assignee: Sumitomo Rubber Industries, Ltd., Kobe (JP)

( * ) Notice: Subject to any disclaimer, the term of this patent is extended or adjusted under 35 U.S.C. 154(b) by 4 days.

(21) Appl. No.: 09/988,754

(22) Filed: Nov. 20, 2001

(65) Prior Publication Data

US 2002/0091184 A1 Jul. 11, 2002

(30) Foreign Application Priority Data

Nov. 20, 2000 (JP) ........................................ 2000-353219

(51) Int. Cl.[7] ................................................ C08K 5/17
(52) U.S. Cl. ...................... 524/236; 524/302; 152/517; 548/164
(58) Field of Search ................................ 524/236, 302; 152/517; 548/164

(56) References Cited

U.S. PATENT DOCUMENTS

| | | | | |
|---|---|---|---|---|
| 3,897,405 A | * | 7/1975 | Son et al. .................. | 525/331.8 |
| 4,421,891 A | | 12/1983 | Miyake et al. .............. | 524/495 |
| 4,745,150 A | * | 5/1988 | Ida et al. .................... | 524/505 |
| 4,814,384 A | * | 3/1989 | Mitchell et al. ............ | 525/211 |
| 5,299,615 A | * | 4/1994 | Ataka .......................... | 152/454 |
| 5,710,218 A | * | 1/1998 | Nakahama et al. ......... | 525/211 |
| 5,840,908 A | * | 11/1998 | Singh et al. ................ | 548/167 |
| 6,230,773 B1 | * | 5/2001 | Sandstrom et al. ......... | 152/517 |

FOREIGN PATENT DOCUMENTS

| | | |
|---|---|---|
| EP | 0 221 384 | 5/1987 |
| EP | 0 509 295 A1 | 10/1992 |
| EP | 0 604 833 A2 | 7/1994 |
| EP | 604833 * | 7/1994 |
| JP | 4-185512 | 7/1992 |
| JP | 5-279514 | 10/1993 |
| JP | 7-32823 | 2/1995 |
| JP | 11-310019 | 11/1999 |
| JP | 11-321252 | 11/1999 |

* cited by examiner

Primary Examiner—David W. Wu
Assistant Examiner—Henry S. Hu
(74) Attorney, Agent, or Firm—Birch, Stewart, Kolasch & Birch, LLP

(57) ABSTRACT

There is provided a rubber composition whose run-flat durability is improved and in which precipitation of sulfur and a vulcanization accelerator on the rubber surface before vulcanization is prevented. Sulfur in an amount of 2 to 8 parts by weight and two or more vulcanization accelerators in a total amount of at least 5 parts by weight based on 100 parts by weight of a rubber component are used, at least one of the accelerators being a sulfen amide accelerator.

3 Claims, 1 Drawing Sheet

RUBBER COMPOSITION FOR TIRE AND TIRE USING THE SAME

BACKGROUND OF THE INVENTION

The present invention relates to a high hardness rubber composition and a tire using the same. More specifically, the present invention relates to a high hardness rubber composition useful as a rubber composition for a tire and a tire using the same.

As run-flat tires employing a high hardness reinforcing rubber for a sidewall have come into practical use, these tires make it possible to drive certain miles even in the case of blowout where the air pressure falls to zero. Then it has become unnecessary for a vehicle to carry a spare tire at all times, which means a reduction of the overall weight of a vehicle is achieved. As to run-flat tire driving, however, the speed and distance are still limited and further improvement of run-flat durability is demanded.

As an effective means for improving run-flat durability, there is a process for increasing the thickness of a reinforcing rubber. However, according to this process, the tire gets heavy whereas the initial purpose of using a run-flat tire is weight reduction.

Other useful processes for improving run-flat durability include the prevention of heat build up by diminishing distortion of a reinforcing rubber itself caused by bending which occurs during run-flat driving. For example, there is a process for increasing the amount of a reinforcing filler such as carbon black. However, the filler has great load on the kneading step, and in addition, heat build up characteristic is increased. Thus, improvement of run-flat durability cannot be expected according to this method.

Another possible process for preventing heat build up of a rubber in response to distortion by external force is to increase the amount of sulfur or a vulcanization accelerator.

When a large amount of low molecular weight powdery sulfur is added, sulfur blooms on the rubber surface before vulcanization, causing lowering of adhesion in the forming step of tire. Therefore, it is generally known to use high molecular weight sulfur called insoluble sulfur. This insoluble sulfur can remain in a rubber as high molecular weight sulfur before vulcanization, while it decomposes into low molecular weight sulfur and can be vulcanized in the same manner as usual low molecular weight sulfur in a hot atmosphere of vulcanization. However, even if insoluble sulfur is used, it decomposes into low molecular weight sulfur due to heat build up and the like during the extrusion step, and blooms on the rubber surface when used in a large amount. For these reasons, it is desirable that the amount of insoluble sulfur is reduced as much as possible when it is used from the viewpoint of processability.

On the other hand, there is a process called effective vulcanization, wherein a small amount of sulfur is mixed with a large amount of a vulcanization accelerator to impart low heat build up characteristics as mentioned above. However, typically used sulfen amide accelerators such as TBBS (N-tert-butyl-2-benzothiazolylsulfenamide) and CBS (N-cyclohexyl-2-benzothiazolylsulfenamide) have low solubility in rubber. Therefore, when the sulfen amide accelerator is used in a large amount, it blooms on the rubber surface before vulcanization, causing lowering of adhesion in the forming step of tire as in the case of sulfur mentioned above.

Meanwhile, a high hardness compound is required also for bead apex of a pneumatic tire to achieve rigidity of a tire concerning controllability. Conventionally, high hardness of bead apex is achieved by adding a thermosetting resin to the composition. However, when such a thermosetting resin is used, there has been a problem that rolling resistance of a tire is increased because of increasing heat build up characteristic.

SUMMARY OF THE INVENTION

An object of the present invention is to improve run-flat durability and to prevent precipitation of sulfur and a vulcanization accelerator on the rubber surface before vulcanization by adding sulfur and vulcanization accelerators to a reinforcing rubber in appropriate amounts. Another object of the present invention is to improve rigidity of a tire and reduce rolling resistance simultaneously by adding sulfur and vulcanization accelerators to a reinforcing rubber in appropriate amounts.

That is, the present invention relates to a high hardness rubber composition comprising 2 to 8 parts by weight of sulfur and at least 5 parts by weight of two or more vulcanization accelerators based on 100 parts by weight of a rubber component, at least one of said accelerators being a sulfen amide accelerator. The present invention also relates to a run-flat tire using the rubber composition for a reinforcing rubber, and a pneumatic tire using the rubber composition for bead apex.

DETAILED DESCRIPTION

Figure 1:
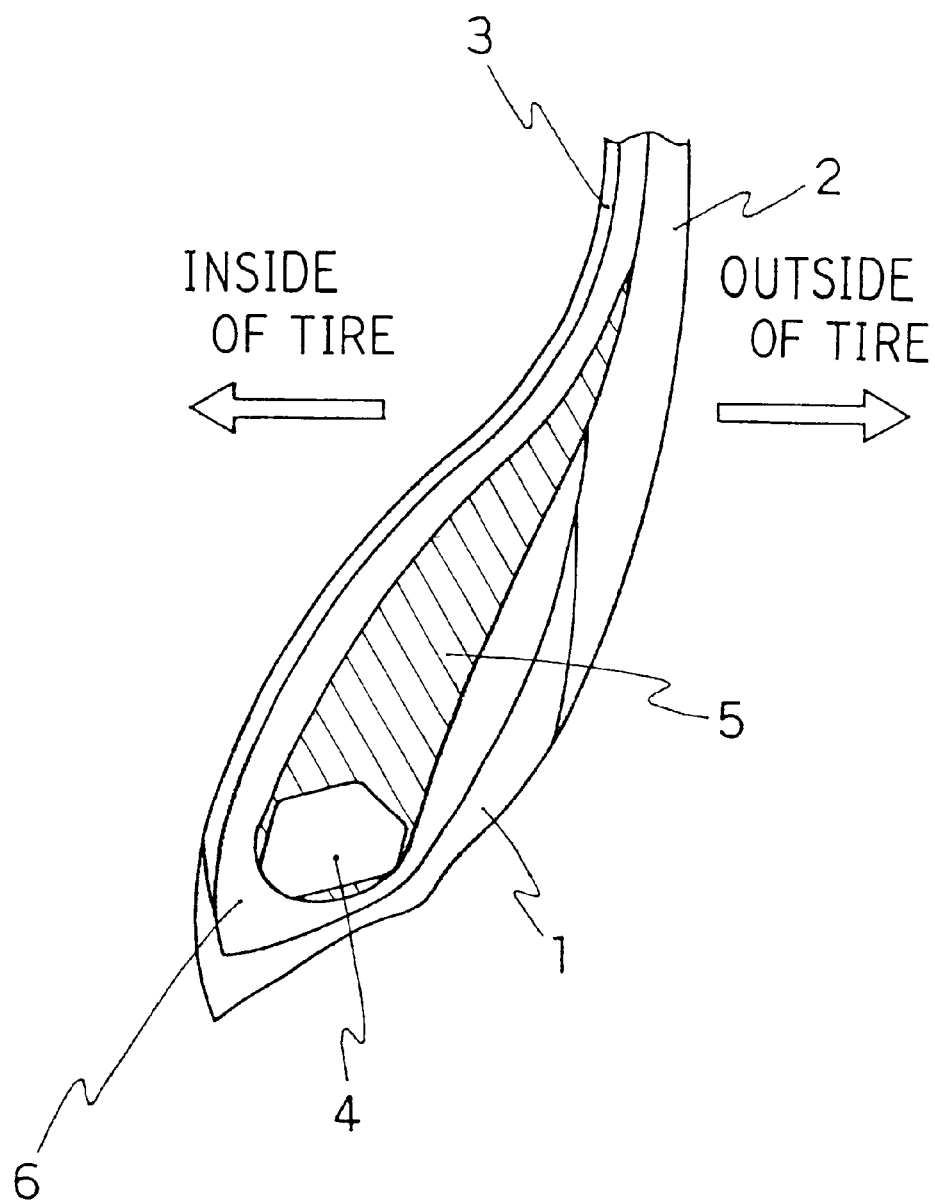
FIG. 1 is a schematic cross-sectional view of a portion near bead part shown for explaining bead apex.

According to the present invention, sulfur and vulcanization accelerators are added to a reinforcing rubber in appropriate amounts, thereby preventing precipitation of sulfur and a vulcanization accelerator on the rubber surface to provide a rubber composition having high hardness and low heat build up characteristics.

Examples of the rubber composition used in the present invention are natural rubber (NR) and diene synthetic rubber such as butadiene rubber (BR), styrene-butadiene copolymer rubber (SBR), isoprene rubber (IR), acrylonitrile-butadiene copolymer rubber, chloroprene rubber, styrene-isoprene copolymer rubber, styrene-isoprene-butadiene copolymer rubber or isoprene-butadiene copolymer rubber. These can be used alone or in combination of two or more. Among these, natural rubber is preferable from the viewpoint of low heat build up characteristics.

It is preferable to use insoluble sulfur in the rubber composition of the present invention from the viewpoint of preventing sulfur from precipitating on the rubber surface.

Sulfur having an average molecular weight of 10,000 to 500,000, particularly 100,000 to 300,000 is preferably used as insoluble sulfur. When the average molecular weight is less than 10,000, sulfur easily decomposes at low temperature and tends to bloom on the rubber surface. When it is more than 500,000, dispersability thereof in a rubber tends to decrease.

The amount of sulfur is 2 to 8 parts by weight, preferably 4 to 6 parts by weight. When the amount of sulfur is less than 2 parts by weight, it is difficult to achieve sufficiently low heat build up characteristic aimed herein. When the amount is more than 8 parts by weight, it is difficult to prevent surface precipitation thereof.

A wide range of compounds are used as a vulcanization accelerator, and sulfen amide accelerators are most frequently used as a delayed vulcanization accelerator since burning is hardly caused during production and vulcanization properties thereof are excellent. As to properties of the rubber after vulcanization, the rubber compound to which the sulfen amide accelerator is added has low heat build up characteristics in response to distortion by external force. Therefore, the compound has a large improvement effect on durability of a run-flat tire which is the most important object of the present invention.

In the present invention, two or more vulcanization accelerators are used, at least one of the accelerator being a sulfen amide accelerator.

Examples of the sulfen amide accelerator are TBBS (N-tert butyl-2-benzothiazolylsulfenamide), CBS (N-cyclohexyl-2-benzothiazolylsulfenamide), DZ (N,N-dicyclohexyl-2- benzothiazolylsulfenamide), and the like.

Other vulcanization accelerators include, for example, MBT (mercaptobenzothiazole), MBTS (dibenzothiazyldisulfide), DPG (diphenyl guanidine), and the like.

The total amount of the vulcanization accelerators is at least 5 parts by weight, preferably 5 to 12 parts by weight, more preferably 8 to 10 parts by weight based on 100 parts by weight of a rubber component. When the amount of the vulcanization accelerators is less than 5 parts by weight, sufficient hardness aimed herein is not achieved. When the amount is more than 12 parts by weight, it is difficult to prevent surface precipitation thereof.

It is preferable that the amount of each vulcanization accelerator is 2 to 5 parts by weight based on 100 parts by weight of a rubber component. When the amount of each vulcanization accelerator is less than 2 parts by weight, it is difficult to obtain desirable hardness and low heat build up characteristics. When the amount of each accelerator is more than 5 parts by weight, there may be a case where the critical amount of each accelerator as to solubility in rubber is exceeded.

The amount of the above sulfen amide vulcanization accelerator is 60% to 100% by weight, preferably 80% to 100% by weight based on the total amount of the vulcanization accelerators. When the amount of sulfen amide vulcanization accelerator is less than 60% by weight, it tends to be difficult to achieve low heat build up characteristics.

It is possible to add carbon black as a reinforcing filler to the rubber composition of the present invention. Any carbon black can be used without particular limitation as long as it is used in a rubber composition for a tire. Examples thereof are carbon black which has a nitrogen adsorption specific area ($N_2SA$) of 30 to 100 $m^2/g$ and dibutyl phthalate (DBP) oil absorption of 50 to 150 ml/100 g. When $N_2SA$ is less than 30 $m^2/g$, there is a tendency that reinforcing effect is inferior and thus sufficient durability cannot be obtained. When $N_2SA$ is more than 100 $m^2/g$, heat build up characteristics tend to increase. When DBP oil absorption is less than 50 ml/100 g, it tends to be difficult to achieve sufficient reinforcing effect. When DBP oil absorption is more than 150 ml/100 g, heat build up during kneading becomes large and insoluble sulfur decomposes, resulting in a tendency that sulfur is likely to bloom on the rubber surface.

Examples of the above carbon black are N220, N326, N330, N351, N339 and the like. These can be used alone or in combination of two or more. Among these, N330 is preferable from the viewpoint of the balance between heat build up and hardness.

In addition to the above components, it is possible to add, to the rubber composition of the present invention, fillers such as silica, talc or clay and reinforcing staple fibers including glass and polyamide; softeners such as process oil including paraffin oil, aromatic oil and naphthene oil; tackifiers such as a coumarone-indene resin, a rosin resin and a cyclopentadiene resin; auxiliary vulcanization activators such as stearic acid and zinc oxide; vulcanization retardants; antioxidants; and the like, if necessary, within the range such that the object of the present invention is not significantly lost.

As to the rubber composition of the present invention, sulfur and vulcanization accelerators do not bloom on the rubber surface before vulcanization, and thus adhesion of the rubber in the forming step of tire is excellent.

The rubber composition of the present invention is disposed within the sidewall part of a run-flat tire as a reinforcing rubber to impart excellent run-flat durability to the tire.

In addition, it is possible to use the rubber composition of the present invention for bead apex of a pneumatic tire, particularly an automobile tire. Herein, FIG. 1 is a schematic cross-sectional view of a portion near a bead part of a tire for explaining bead apex. Numeral 1 indicates a chafer, numeral 2 a sidewall, numeral 3 innerliner, numeral 4 bead core, numeral 5 bead apex and numeral 6 a ply. A pneumatic tire using the rubber composition of the present invention is excellent in low heat build up characteristics and rigidity concerning controllability.

EXAMPLE

The present invention is explained in detail based on Example below, but the present invention is not limited thereto.

Chemicals used in Example and Comparative Examples are shown below.

NR: RSS #3
BR: UBEPOL BR150B available from Ube Industries, Ltd.
Carbon black: N330 available from Showa Cabot Co. Ltd.
Antioxidant: Santoflex 13 ((N-1,3-dimethylbutyl)-N'-phenyl-p-phenylenediamine) available from FLEXSYS CO.
Stearic acid: KIRI available from NOF Corporation
Zinc White: Oxide Zinc No. 2 available from Mitsui Mining and Smelting Company, Limited Sulfur: Mu-cron OT available from Shikoku Chemicals Corporation Vulcanization accelerator TBBS: Nocceler NS (N-tert-butyl-2-benzothiazolylsulfenamide) available from Ohuchi Shinko Kagaku Kogyo Co. Ltd.

Vulcanization accelerator CBS: Nocceler CZ (N-cyclohexyl-2-benzothiazolylsulfenamide) available from Ohuchi Shinko Kagaku Kogyo Co. Ltd.

Evaluation criteria used in Example and Comparative Examples are as follows.

Properties of Unvulcanized Rubber

Sheets of kneaded but unvulcanized rubber were kept for two days at room temperature. Surface appearances were compared and evaluated visually based on the following criteria.

○: No precipitant is observed.

Δ: A small number of spots are partly observed.

x: A large number of spots are observed all over the surface.

xx: The rubber surface is covered with precipitants.

Properties of Vulcanized Rubber

JIS-A hardness of the respective vulcanized rubbers was measured at 175° C.

Run-flat Durability

Three lining strip layers made of each rubber composition in Example and Comparative Examples were disposed within the sidewall to prepare a run-flat tire having a size of 215/45ZR17.

The obtained tires were run on a drum at a rate of 80 km/hour, air pressure being 0 kPa. Comparison was made between number of miles driven before tire had broken. The results are shown in index number on the basis of the value in Comparative Example 1 (100). The larger the value, the more excellent run-flat durability is.

Low Heat Build Up Characteristic

Tan δ at 60° C. was measured by using VES-F-3 made by Iwamoto Corporation at a frequency of 10 MHz under an initial strain of 10% and a dynamic strain of 2%. The larger the tan δ, the lower the heat build up characteristic is, meaning that an advantageous property for a rubber composition is achieved.

Example 1 and Comparative Examples 1 to 7

The composition shown in Table 1 except for sulfur and the vulcanization accelerators (TBBS and CBS) was kneaded by using a 1.7 L Banbury mixer made by Kobe Steel, Ltd. at about 150° C. for four minutes. Sulfur and the vulcanization accelerators were added to the kneaded composition, and the mixture was kneaded at about 80° C. for four minutes by using a twin-screw roller. The mixture was vulcanized at 170° C. for 12 minutes to obtain a vulcanized rubber. The obtained rubber was evaluated according to the above criteria.

The results are shown in Table 1.

When at least 8 parts by weight of insoluble sulfur was added (Comparative Examples 2 and 3), surface precipitation was observed after an unvulcanized composition was left at room temperature.

When each of the vulcanization accelerators was added alone in an amount of at least 5 parts by weight (Comparative Examples 4 to 7), surface precipitation was observed though precipitation of CBS was smaller than that of TBBS.

On the other hand, hardness of the rubber composition after vulcanization was increased and run-flat durability tended to increase as the amount of the vulcanization accelerators was increased (Comparative Examples 4 to 7).

When TBBS and CBS were added in amounts of 4 parts by weight, respectively, i.e., in a total of 8 parts by weight (Example 1), surface precipitation was not observed. Further, the obtained composition showed run-flat durability as excellent as that of the compositions obtained by adding 8 parts by weight of only one vulcanization accelerator (Comparative Examples 5 to 7).

In short, when two vulcanization accelerators are used, these can be added in a critical amount as to solubility and surface precipitation is unlikely to occur. Furthermore, properties after vulcanization are the same as that of a rubber composition to which a large amount of only one vulcanization accelerator was added.

TABLE 1

| | | | Ex. No. 1 | Com. Ex. No. 1 | 2 | 3 | 4 | 5 | 6 | 7 |
|---|---|---|---|---|---|---|---|---|---|---|
| Composition (part by weight) | NR | | 70 | 70 | 70 | 70 | 70 | 70 | 70 | 70 |
| | BR | | 30 | 30 | 30 | 30 | 30 | 30 | 30 | 30 |
| | Carbon Black N330 | | 50 | 50 | 50 | 50 | 50 | 50 | 50 | 50 |
| | Antioxidant | | 1.5 | 1.5 | 1.5 | 1.5 | 1.5 | 1.5 | 1.5 | 1.5 |
| | Stearic acid | | 2 | 2 | 2 | 2 | 2 | 2 | 2 | 2 |
| | Zinc oxide | | 3 | 3 | 3 | 3 | 3 | 3 | 3 | 3 |
| | Insoluble sulfur | | 6 | 6 | 8 | 10 | 6 | 6 | 6 | 6 |
| | TBBS | | 4 | 2 | 2 | 2 | 5 | 8 | — | — |
| | CBS | | 4 | — | — | — | — | — | 5 | 8 |
| Properties | Properties of unvulcanized rubber | Surface precipitation | ○ | ○ | Δ | x | x | xx | Δ | x |
| | Properties of vulcanized rubber | Hardness JIS-A | 80 | 73 | 75 | 75 | 78 | 80 | 76 | 77 |

TABLE 1-continued

| | | Ex. No. 1 | Com. Ex. No. 1 | 2 | 3 | 4 | 5 | 6 | 7 |
|---|---|---|---|---|---|---|---|---|---|
| Run-flat durability | Driving distance (index number) | 189 | 100 | 123 | 130 | 183 | 190 | 154 | 148 |
| Low heat build up characteristic | tan δ | 120 | 100 | 110 | 116 | 104 | 106 | 101 | 103 |

By using the rubber composition of the present invention as a reinforcing rubber of a run-flat tire, sulfur and a vulcanization accelerator do not bloom on the rubber surface before vulcanization, and it is possible to impart excellent run-flat durability to a tire. In addition, rolling resistance is reduced and controllability is improved by using the rubber composition of the present invention for bead apex of a pneumatic tire.

What is claimed is:

1. A high hardness rubber composition comprising 2 to 8 parts by weight of sulfur and two or more vulcanization accelerators in a total amount of at least 5 parts by weight based on 100 parts by weight of a rubber component, wherein at least one of said accelerators is a sulfenamide accelerator.

2. A run-flat tire comprising the rubber composition of claim 1, wherein said rubber composition is used for a reinforcing rubber.

3. A pneumatic tire comprising the rubber composition of claim 1, wherein said rubber composition is used for bead apex.

* * * * *